Patented Apr. 29, 1941

2,240,014

UNITED STATES PATENT OFFICE 2,240,014

SOUND DEADENER

Paul G. Peik, Detroit, Mich., assignor to Emulsions Process Corporation, New York, N. Y., a corporation of Delaware No Drawing. Application June 7, 1938, Serial No. 212,396

6 Claims. (Cl. 260—723)

The present invention relates to products primarily adapted for use in insulating automobile bodies and the like against the transmission of sound and heat and for damping out vibrations which produce resonance and sound audible to the ear.

More specifically, the invention has particular relation to the production of a novel rubber spray-on sound deadening composition containing an extremely low percentage of rubber and a very high percentage of filler aggregate with consequent high sound-deadening efficiency and definite thermal insulating properties, as well as low cost.

The present invention is based on the discovery that an extremely great intensity of internal friction can be set up in a sponge rubber composition of the character here involved, provided full advantage is taken of the following means to this end:

(1) Incorporating a high percentage of aggregate in relation to rubber base;
(2) Using an aggregate of relatively high specific gravity;
(3) Employing the maximum particle size of aggregate practicable for spraying.

The importance of these factors toward creating internal friction in the aforesaid type of sponge rubber composition will be apparent as the present disclosure proceeds.

Rubber sound deadening compositions are not broadly novel. It is known to incorporate light aggregates such as rock wool, asbestos fiber, vegetable fiber, etc. in solutions of rubber in conventional rubber solvents. Efforts to produce an efficient spray-on deadener for automobile bodies from these ingredients have heretofore uniformly failed. One reason for this failure is that it has heretofore been impossible to include in the composition the requisite quantity of heavy aggregate of suitable particle size without producing a product of such thickness as to be incapable of being sprayed.

Previous efforts to adapt spray-on rubber compositions which under reaction would form sponge rubber have failed because of lack of uniformity of sponging during the setting process. This is partially due to segregation of the gas and uneven expansion of the gas during the heating process.

The panel to which the deadener is applied, (according to previous procedure), is held at a setting temperature until the volatile solvent material of the rubber solution coating has been evaporated and the enamel or lacquer on the outside of the panel has been set. The evaporation of the solvent material produces a corresponding shrinking of the applied coating and, consequently, a commensurate loss of mass which, in turn, seriously impairs the sound deadening efficiency of the coating.

It has now been discovered that these deficiencies of the previous procedure can be obviated by the employment, as the base of the sound deadening material, of an emulsion of cut-back rubber compound, using any conventional rubber solvent to effect solutional rubber and preparation of an emulsion with this rubber compound preferably prepared by a method and apparatus such as disclosed in United States Patents Nos. 2,059,535 and 2,059,536, owned by the Gas Fuel Corporation. In using such apparatus in connection with the present invention, the rubber is dissolved in a suitable solvent and is introduced into the mill. A suitable quantity of water is also introduced and also an inert gas, if a gas is to form part of the emulsion. The mill violently beats such substances and acts to cut and pulverize the same, so that an oil phase emulsion of dispersed or "dissolved rubber" is obtained. Good results are secured by operating the mill under superatmospheric pressure. The rubber base is preferably emulsified in the presence of substantial quantities of water (50%) and an inert gas such as nitrogen or the like, as will hereinafter appear. By the use of this rubber compound emulsified in the manner described, the deficiencies of the use of sponge rubber as sound deadening material is important and made useful and practical because during the setting process when submitted to heat, the action of the finely dispersed water in the emulsion causes uniform sponging so that there is a uniform distribution of cells and uniform density of material throughout the entire mass. This results in uniform thickness of material and eliminates the bulging or uneven thickness obtained by former practice.

It has been discovered that this emulsified rubber base is extremely stable, particularly so if it has been prepared in the presence of an inert gas, and that it has the capacity of being incorporable with heavy aggregate of the character of sand, grit, cast iron borings, crushed iron ore, quartz, crushed cinders such as "Haydite," etc. in extraordinary amount,—as high as 250% by weight of the emulsion. Percentages of aggregate up to 195% is practicable for spraying purposes. The latter possesses a firm jelly-like consistency as well as a unique mobility, neither of which is affected by the addition of the aggregate so that the admixture is readily sprayable and does not creep on vertical panels either before or during passage through the ovens. The ratio of aggregate to rubber thus attainable is extremely high as compared with the low ratio attainable when employing the unemulsified material according to the prior art.

It has further been discovered that, due to the presence of water in the admixture, the shrinkage of the coating on the sprayed panel as experienced by the prior art, above outlined, is eliminated and is instead replaced by an expansion effect due to the action of the water as it vaporizes in the baking oven, leaving a cellular or porous structure of substantially increased thickness. These results, flowing directly from the use of the emulsified rubber base according to this invention, endow the product with remarkable sound absorbing and deadening properties.

The rubber ingredient of the composition which is sprayed onto the article being coated is preferably uncured anticipating vulcanization which takes place in the heating or baking oven, although the invention is not restricted in this respect.

The emulsified rubber base used in the present invention is admixed, in accordance with one embodiment of the invention, only with a relatively very large amount of heavy aggregate. According to a second embodiment, a relatively small amount of fibrous aggregate, of the character of rock wool, asbestos, hair, wood flour, etc., is also incorporated in the admixture. This fibrous type of aggregate has been found to overcome and eliminate any tendency which the heavy aggregate may have to segregate into layers. According to a further form of the invention, the fibrous anti-segregation component is made up of prevulcanized rubber threads. Machinery for producing such threads is now being used in the rubber industry. These threads are substituted in the previously described embodiment of the invention for the non-elastic fibrous aggregate there employed and in substantially the same proportion. These rubber threads are usually vulcanized at a temperature somewhat higher than the temperature prevailing in automotive enameling ovens, so that they do not suffer any loss of elasticity nor are they otherwise prejudiced by the oven treatment. The presence of these threads prevents creeping of the sprayed coating on the panel, eliminates segregation of the heavy aggregate during shipping and storing of the mixture, and does not deleteriously affect the sound deadening efficiency of the product. In the latter respect, these fine rubber threads are superior to ordinary fibrous aggregate which, due to its lack of elasticity, destroys the sound deadening efficiency.

In making the admixture according to the invention, it is of course necessary to provide particle size of the filler and aggregate so that the admixture is assured of a character enabling it to be gun-sprayed. It has been found that the inherent characteristic of the rubber emulsion is its fluidity and mobility which enables it to be readily sprayed even with large percentages of aggregate and filler materials. Maximum possible particle size compatible with sprayability is preferred. The particle size of the heavy aggregate preferably has a range of 10 by screen test. I prefer to use particles which will pass through a 20 to 25 mesh screen and which will be stopped by a 30 or 35 mesh. For practical purposes, ungraded sand is suitable as the particles are about right. Such sand may be readily sprayed. Of course, the particles will vary in size and contour, but so far as shape is concerned, the particles will, roughly speaking, have the contour of a sphere, cube or elongated rhomboidic particles.

Capacity to damp out vibrations and consequent sound is dependent upon the absorption of these vibrations by inertia as well as by the internal friction that is built up within the mass of deadening material and which results in resistance to flow of vibrations.

Comparative tests to determine the relative quality and value of products of the type of those made in accordance with the present invention have been developed at the University of Michigan, and these tests are being used by the automotive industry today in conjunction with their sound proofing work. Use is made of a test panel of predetermined specifications which is coated and treated in the same manner as it would be in the body manufacturing plant. This panel is then attached to the test apparatus where, by means of a blow or otherwise, vibration is set up and the volume of sound and the period of audibility is measured by an oscilloscope. An indicator number is assigned to panels of known sound resisting characteristics and, for purposes of comparison, the factor 15 is considered very good, the value of the product increasing as the factor decreases. Auto body deadeners now in use carry a rating of 15 to 20 by scale according to test here described, and the automotive industry is uniformly raising specifications seeking to obtain auto body deadening materials which carry rating of 12 to 15, hoping to reach 10. Heretofore, spray-on material has been used only for side panels but because of resilience and heat insulation qualities, it is possible to use this material for floors and roofs, where the ratings used on materials at present require 6 for floors and 20 for roofs. Tests made on present invention according to University of Michigan's method of test, have been given ratings as low as 2.6 and 3.2.

It has further been found, as hereinbefore indicated, that when an inert gas under pressure (115 pounds per square inch, for example, or over), is present during the formation of the aqueous emulsion including a cut back of rubber compound, rubber cement or the like, optimum results are obtained. A preferred gas for this purpose is nitrogen. The presence of an inert gas of this character blocks out the possibility of oxygen being present during the formation of the emulsion and also prevents the inclusion of oxygen in the globules formed within the emulsified mass. Nitrogen has been found to be particularly effective in stabilizing the emulsion, even if the latter has a very high (of the magnitude of 50%) water content.

The following illustrative examples show typical embodiments of the invention.

*Example I*

An emulsion made in the Gas Fuel Corporation apparatus by the method described in U. S. Patents Nos. 2,059,535 and 2,059,536, and comprising as ingredients virgin rubber, a conventional rubber solvent such as naphtha or the like, water, and an inert gas, such as nitrogen, is intimately admixed with beach sand, the particle size of which is determined so that the final admixture is capable of being readily gun-sprayed.

The rubber solution used may contain as much as 70% of solvent, and the final emulsion may contain as much as 75% of water. It has been found that the optimum percentage of water incorporated into the emulsion with the cut-back rubber is about 50%. This percentage of water permits the maximum incorporation of aggregate material.

In making the admixture from this emulsified rubber base and the heavy aggregate, the latter may be used for example, in an amount equal to 195% by weight of the base.

The panel to be treated is coated with this admixture by spraying, and the coated article is then further manipulated in the conventional manner as hereinbefore set forth.

An outstanding characteristic of the rubber emulsion base, and one which makes it particularly suitable for use in the production of a sound deadener, is its capacity for taking up large amounts of aggregate filler, as above indicated. As the water evaporates when the deadener sets during the heat treatment of the coated panel (as in passing through the ovens in automotive body plants), the ratio of aggregate to rubber is increased, since the quantity of base present is reduced. Since, generally speaking, the higher the percentage of aggregate to base the greater the sound deadening efficiency, it is apparent that the resultant composition is an excellent sound deadener. Moreover, the elimination of the water produces a porous product and obviates shrinking thereof.

The ratio of aggregate to rubber base attainable in the final product according to the present invention cannot even be approached when use is made of conventional unemulsified rubber base.

The quantity of water in the emulsified base may be varied. Thus, for example, a satisfactory product may also be obtained when the rubber emulsion base contains 50% by weight of water.

Use may also be made of reclaimed rubber instead of virgin rubber as specifically disclosed and claimed in my application, Serial No. 212,397, filed June 7, 1938.

*Example II*

The procedure described in Example I is followed, except that 5% by weight of the emulsion of light fibrous aggregate, e. g. mineral wool, is also incorporated in the admixture to be sprayed.

*Example III*

The procedure described in Example I is followed, except that a maximum of 5% by weight of the emulsion of pre-vulcanized fine rubber threads is also incorporated in the admixture to be sprayed.

The examples have been given in connection with the sound deadening or insulating of automobile body panels, but it is manifest that the mixture may be used wherever applicable. I propose to use it in connection with refrigerators of various types, and to preform it into insulating and sound deadening slabs for ceilings or walls of rooms such as public buildings, theatres, moving picture houses, etc.

While I have disclosed the principle of my invention as well as specific embodiments thereof, in such manner that it may be readily understood by those skilled in the art, I am aware that changes may be made in the details disclosed, without departing from the spirit of the invention, as expressed in the claims.

What I claim and desire to secure by Letters Patent is:

1. In the manufacture of a sound deadening composition, dissolving uncured rubber in a volatile solvent, finely dispersing a high per cent of water and an inert gas therein while maintaining the components under superatmospheric pressure and thereby forming a non-colloidal water-in-oil emulsion of uncured rubber in which the rubber solution is the continuous phase, and mixing said emulsion with a heavy aggregate approximately twice the weight of the emulsion and consisting of rigid inflexible particles of a particle size to pass through a 20 mesh screen but incapable of passing through a 35 mesh screen.

2. In the manufacture of a sound deadening composition, dissolving uncured rubber in a volatile solvent, finely dispersing a high per cent of water and an inert gas therein while maintaining the components under superatmospheric pressure and thereby forming a non-colloidal water-in-oil emulsion of uncured rubber in which the rubber solution is the continuous phase, mixing said emulsion with a heavy aggregate approximately twice the weight of the emulsion and consisting of rigid inflexible particles of a particle size to pass through a 20 mesh screen but incapable of passing through a 35 mesh screen, and also mixing with the emulsion a small percentage of a light aggregate in sufficient quantity to prevent the heavy aggregate from segregating into layers.

3. In the manufacture of a sound deadening composition, dissolving uncured rubber in a volatile solvent, finely dispersing a high per cent of water therein while maintaining the components under superatmospheric pressure and thereby forming a non-colloidal water-in-oil emulsion of uncured rubber in which the rubber solution is the continuous phase, mixing said emulsion with a heavy aggregate approximately twice the weight of the emulsion and consisting of rigid inflexible particles of a particle size to pass through a 20 mesh screen but incapable of passing through a 35 mesh screen, and also mixing with the emulsion a small percentage of pre-vulcanized elastic threads in sufficient quantity to prevent creeping of the composition and eliminate segregation of the heavy aggregate into layers during shipping and storing of the composition.

4. A sound deadening composition consisting of a non-colloidal water-in-oil emulsion of uncured rubber having a high per cent of water finely dispersed therein and in which the rubber solution is the continuous phase, said emulsion having finely dispersed therein an inert gas to stabilize the emulsion and block out oxygen, a heavy aggregate approximately twice the weight of the emulsion in intimate admixture with the latter and consisting of rigid inflexible particles of a particle size to pass through a 20 mesh screen but incapable of passing through a 35 mesh screen, and a light aggregate in sufficient quantity to eliminate any tendency of the heavy aggregate to segregate in layers, the light aggregate being present in the composition in a proportion of approximately 5% by weight of the emulsion.

5. A sound deadening composition consisting of a non-colloidal water-in-oil emulsion of uncured rubber having a high per cent of water finely dispersed therein, and in which the rubber solution is the continuous phase, a heavy aggregate approximately twice the weight of the emulsion in intimate admixture with the latter and consisting of rigid inflexible particles of a particle size to pass through a 20 mesh screen but incapable of passing through a 35 mesh screen, and a small amount of pre-vulcanized elastic rubber threads in sufficient quantity to prevent creeping of the composition and to eliminate segregation of the heavy aggregate into layers during shipping and storing of the composition, said rubber threads being present in the composition in about 5% by weight of the emulsion.

6. A sound deadening composition consisting of a non-colloidal water-in-oil emulsion of uncured rubber having a high per cent of water finely dispersed therein and in which the rubber solution is the continuous phase, said emulsion having finely dispersed therein an inert gas to stabilize the emulsion and block out oxygen, a heavy aggregate approximately twice the weight of the emulsion intimately mixed with the latter and consisting of rigid inflexible particles of a particle size to pass through a 20 mesh screen but incapable of passing through a 35 mesh screen, and a small amount of pre-vulcanized elastic rubber threads intimately mixed with such admixture, said threads being present in the composition in about 5% by weight of the emulsion and being sufficient in quantity to prevent creeping of the composition and to eliminate segregation of the heavy aggregate into layers during shipping and storing of the mixture.

PAUL G. PEIK.